Nov. 10, 1936.                M. E. HENNING                2,060,671
                                FAN SWITCH
                            Filed July 11, 1932
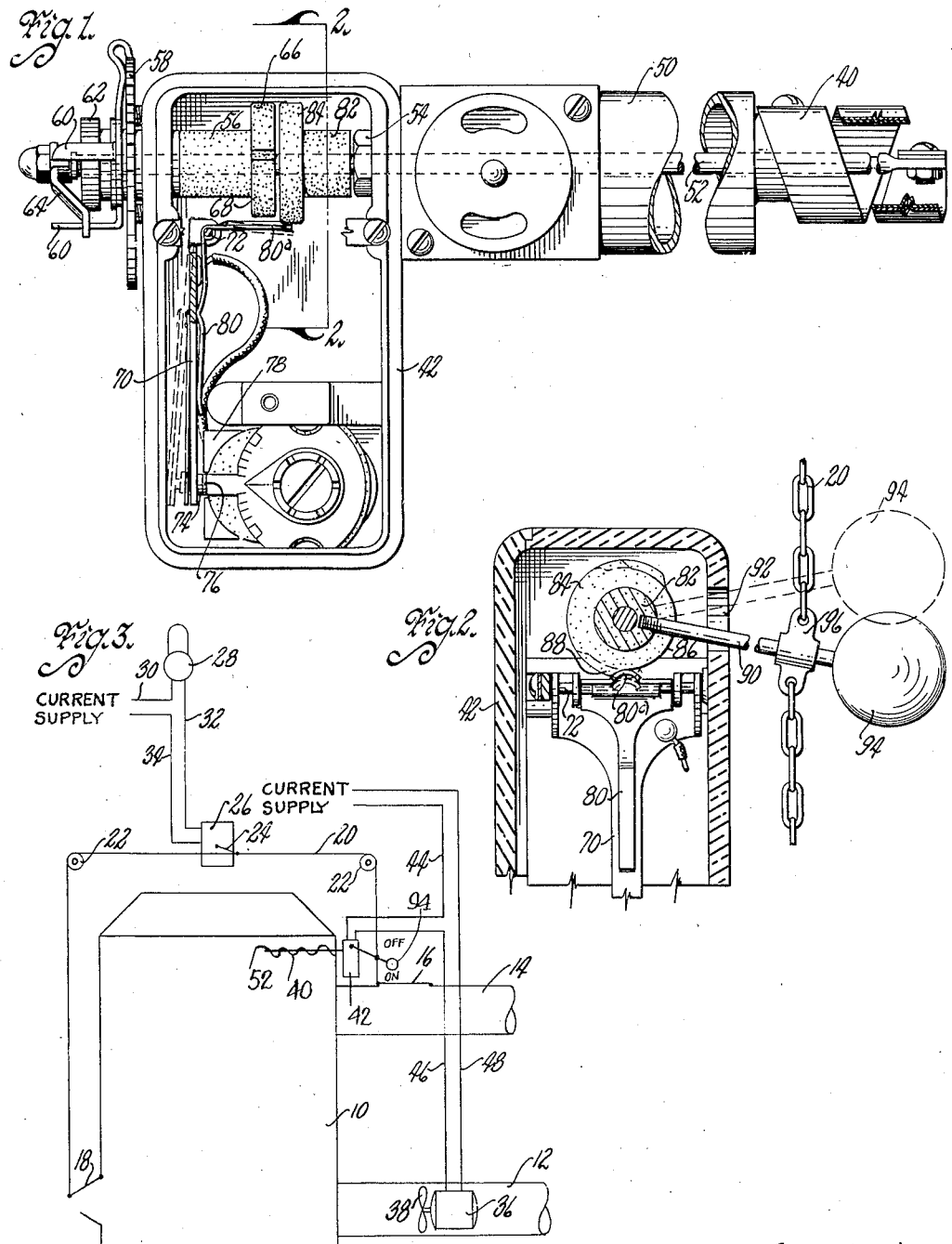
Inventor
Malcolm E. Henning
By Bair, Freeman & Sinclair
Attorneys
Witness
Edw. Seeley Patented Nov. 10, 1936

2,060,671

UNITED STATES PATENT OFFICE 2,060,671

FAN SWITCH

Malcolm E. Henning, Des Moines, Iowa, assignor to Penn Electric Switch Co., Des Moines, Iowa, a corporation of Iowa Application July 11, 1932, Serial No. 621,807

2 Claims. (Cl. 200—138)

The primary object of this invention is to provide, in connection with a thermostatic device for automatically controlling the operation of a fan motor which is used for stimulating the circulation of air in a warm air heating system, an automatic switch or latch means for temporarily suspending the function of the thermostatic control at such times as the draft damper of the furnace is closed and the furnace is in practically quiescent condition.

A further object of this invention is to provide, in combination with means for controlling the operation of a warm air furnace in accordance with room temperatures, the system including a fan for stimulating the circulation under control of temperature conditions within the furnace casing, a means for preventing the operation of the fan at certain times when the conditions within the furnace casing would ordinarily cause its operation, this suspension of the automatic fan control occurring at times when the furnace is in relatively inactive condition due to the controlled positions of its dampers.

Still another object is to provide a fan motor control of thermostatic type having a supplemental switch or cam latching element connected with the damper controls of a furnace and operative at certain positions of the dampers for suspending the automatic regulation of the fan motor.

With these and other objects in view my invention consists in the construction, arrangement and combination of the various parts of my device, whereby the objects contemplated are attained as hereinafter more fully set forth, pointed out in my claims, and illustrated in the accompanying drawing, in which:—

Figure 1 is a front elevation of a control structure embodying certain elements of my invention, the cover plate being removed from the housing.

Figure 2 is a section on the line 2—2 of Figure 1, showing the two positions of the cam actuating member employed to carry out the purposes of my invention.

Figure 3 is a diagrammatic view showing the switch structure of my invention used in connection with a control means for the dampers of a furnace and a thermostatic control for automatically regulating the motor of a circulating fan.

The heating and control system with which my present invention is employed includes a warm air furnace designated generally by the numeral 10, said furnace having a cold air inlet duct 12 and a flue or stack 14. In the flue 14 is the usual hinged check damper 16 and at the lower front part of the furnace is the usual hinged draft damper 18.

The dampers 16 and 18 are provided with suitable control means by which they are operated in opposition to each other so that the one is open while the other is closed. The control means includes a draft element such as a chain or the like 20 fixed at one end to the free edge of the check damper 16 and at the other end to the free edge of the draft damper 18 and running over suitable pulleys 22. Intermediate of its ends the draft member 20 is fixed to a crank arm 24 of a damper motor 26 which is automatically operated by a room thermostat 28. Current wires 30, 32 and 34 are provided for connecting the thermostat 28 and motor 26 with a source of current supply.

By this arrangement the positions of the dampers 16 and 18 are regulated automatically in accordance with temperature conditions in the space where the thermostat 28 is located. In other words, when the furnace is in operation and the elements connected up as shown, when heat is required in the room or space the thermostat 28 closes the circuit through the circuit wires for operation of the damper motor 26 to open the draft damper 18 as shown in Figure 3 and when the temperature has reached the predetermined point to which the thermostat is set, an opposite operation occurs which closes the draft damper 18 and opens the check damper 16, thereby placing the furnace in substantially quiescent or inactive condition.

Although I have illustrated and described my present invention in connection with automatic regulation of the damper system of the furnace, it is to be understood that under some circumstances it may be employed in connection with manual control of the dampers.

In many such systems there is employed a means for artificially stimulating the circulation of air. Such means may include a fan motor 36 for operation of a fan 38 placed in the cold air duct 12. The automatic control means includes a bimetallic thermostat 40 operating in conjunction with other elements in a housing 42. The housing 42 is placed in suitable position outside of the furnace 10 so that the thermostat 40 may project within the casing of the furnace, preferably in a location near the upper end or bonnet of the furnace casing at a point where there is considerable heat when the furnace is in operation. The elements within the housing 42, which will later be described in detail, are connected by suitable current wires 44, 46 and 48 to the fan motor 36 and to a suitable source of current supply. By this arrangement, which is common and well known, the operation of the motor 36 is regulated in accordance with heat conditions within the furnace casing where the thermostat 40 is located.

The present invention has to do particularly with a means for temporarily suspending the automatic control of the fan 36 at such times as the damper system is in the opposite position to that illustrated in Figure 3. In other words this invention provides a temporary and automatic latching or switch means, mechanically connected with the controls for the dampers and altogether preventing the operation of the fan while the draft damper 18 is closed and the furnace in substantially inactive or quiescent condition, regardless of the temperature in the furnace casing 10 which would affect the operation of the thermostat 40.

Turning now to the specific structure of the fan control means, it will be noted that the switch housing 42 is formed with a tubular hub 50 which is arranged to be inserted through the wall of the furnace casing 10 so as to locate the thermostat 40 in the desired position. The thermostat 40, which is a bimetallic coil, projects through the hub 50 and has one end anchored thereto and its other end secured to a rod 52. Temperature changes within the furnace where the coil 40 is located will automatically impart rotary movement to the rod 52 which extends rotatably through a bushing 54 and through a sleeve 56 carried by the housing 42. The sleeve 56 is journaled in the opposite or outer wall of the housing 42 and the rod 52 projects rotatably therethrough.

A disc 58 and a pair of stop arms 60 are secured to the projecting portion of the sleeve 56 by a nut 62 arranged to rotate with the sleeve. The stops 60 are adjustable relative to the disc 58 when the nut 62 is loosened for the purpose of changing the temperature adjustment in a manner disclosed in Letters Patent No. 1,843,601, granted to me February 2, 1932.

To transmit rotary movement from the rod 52 to the sleeve 56, I provide a lever 64 secured to the rod 52 and movable between the stops 60 whereby a lost motion connection is provided.

A cam 66 is formed on or fixed to the sleeve 56 for rotation therewith, said cam being provided in one part of its periphery with a notch or depression 68.

A control device is provided in the form of a switch arm 70 pivoted on a pin 72 and carrying a contact 74 which is engageable with a stationary contact 76. A magnet 78 is provided which acts upon the switch arm 70 to constrain it toward closed circuit position. A resilient bell crank 80 is mounted on the pin 72 for imparting movement from the cam 66 to the switch arm 70.

It will be observed that one end of the bell crank 80 is transversely curved as indicated at 80a and engages the periphery of the cam 66. The depression or notch 68 of the cam permits the contact 74 to engage the contact 76, because of the magnetic pull of the magnet 78 on the switch arm 70, whenever said depression or notch registers with the end of the bell crank, in the normal actuation of the automatic fan control. This contact engagement serves to close the circuit through the wires 44, 46 and 48 for operation of the fan motor 36 and fan 38.

This brings us to the novel means I have provided in accordance with the present invention for suspending the automatic regulation of the fan motor at times as previously set out herein.

A sleeve 82 is loosely mounted on the rod 52 within the switch housing 42 and is provided with a cam disc 84 which occupies a position parallel with and adjacent the cam 66. The periphery of the cam disc 84 is formed with a depression or elongated notch 86 which registers at times with the end portion 80a of the bell crank and permits the normal movement of said bell crank as controlled by the cam 66, for regulating the fan motor as previously described. The depression or notch 86 of the cam disc 84 terminates in a cam 88, which at times engages and presses against the end 80a of the bell crank and prevents oscillation thereof, serving to hold the switch lever 70 in the dotted line position of Figure 1, and thereby serving to keep the fan circuit open, regardless of high temperature which may still prevail in the furnace casing and which would normally act through the thermostat 40 to cause operation of the fan.

An elongated arm 90 is fixed at one end to the sleeve 82 and projects through an opening 92 in one wall of the housing 42. If deemed necessary a weight 94 may be mounted on the free end of the arm 90.

The draft chain 20 of the damper control system is provided at a suitable point intermediate of its ends with a clamping device 96, which is fixed to the free end portion of the arm 90 and the arrangement is such that when the draft element 20 is in position for closing the check damper 16 and opening the draft damper 18, the arm 90 is moved downwardly, or is permitted to move downwardly by gravity to the full line position of Figure 2. When said draft element is in position for opening the check damper 16 and closing the draft damper 18, the arm 90 is moved upwardly to the dotted line position of Figure 2. In the former position the notch 86 of the cam disc 84 registers with the end 80a of the bell crank so that the automatic fan regulation is operative. In the latter position of the arm 90, the cam 88 of the cam disc 84 is moved into engagement with the end 80a of the bell crank and the lever 70 is thereby held against operation, thus suspending the automatic fan regulation. In other words, when the draft damper 18 is open and the furnace is active, the thermostat 40 is permitted to continue its normal operation for automatically regulating the fan motor 36 in accordance with temperature conditions in the furnace casing 10, for stimulating the circulation of air; and when the draft damper 18 is closed, thereby rendering the furnace comparatively inactive and quiescent, the cam 88 serves as a latch or holding means for the switch arm 70, thus preventing any operation of the fan 38 through the normal automatic control means. That is to say—when the furnace is comparatively inactive, the fan 38 is not permitted to operate for stimulating the circulation of air, even though the temperature conditions within the furnace casing would normally serve to actuate the thermostat 40 and close the circuit through the fan motor.

This latching or switch holding means is desirable because it is not necessary and in fact would be undesirable to use the fan and obtain an accelerated circulation of warm air when the room temperatures are such as to cause the room thermostat 28 or other control means to close the draft damper 18 and thereby check the operation of the furnace.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. For use with a movable member for automatically controlling the dampers of a furnace and an element responsive to the temperature of the bonnet thereof, a switch continuously biased to closed position and a pair of means for operatively connecting said switch to said movable member and element, the first of said pair of means being operative to open said switch independent of the second means, the second means being operable to engage and thereby open said switch independent of the first means or disengage and thereby permit it to close only when the first means is inoperable to open the switch, said second means being inoperable to open said switch or to permit it to close when it is retained open by said first means.

2. For use with a movable member for automatically controlling the dampers of a furnace and a temperature responsive element responsive to the temperature of the bonnet of the furnace, a control device comprising a casing, a rod extending therefrom, said temperature responsive element having one end connected with said casing and its other end connected with said rod for rotating said rod upon changes in temperature, a switch within said casing continuously biased to closed position and a pair of cams on said rod for operating said switch, one of said cams being connected with the rod and operable to open said switch or permit it to close under the influence of its bias and the other cam being connected with said movable member and operable when said movable member is at one of its limits of movement to open said switch independent of the first cam and retain it in such open position and incapable of being further controlled by said first cam regardless of the position of the first cam, said second cam when said movable member is at its other limit of movement disengaging said switch to permit it to be controlled by said first cam.

MALCOLM E. HENNING.